May 21, 1968     C. E. STROBURG ET AL     3,384,109
FLOAT VALVE
Filed April 12, 1965
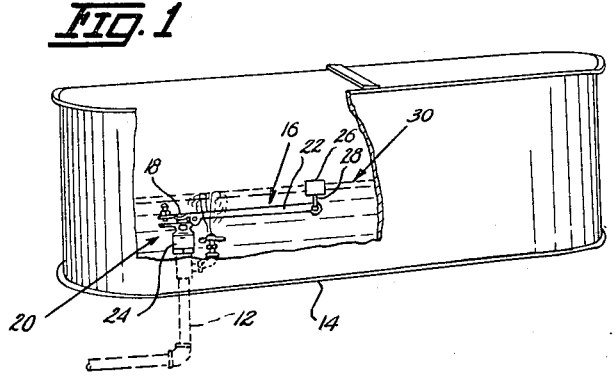
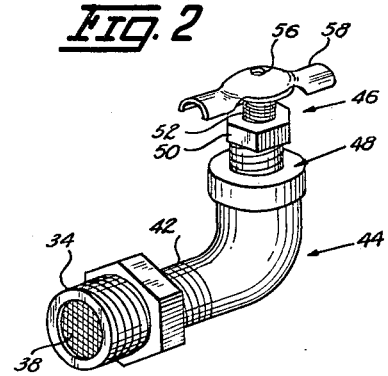
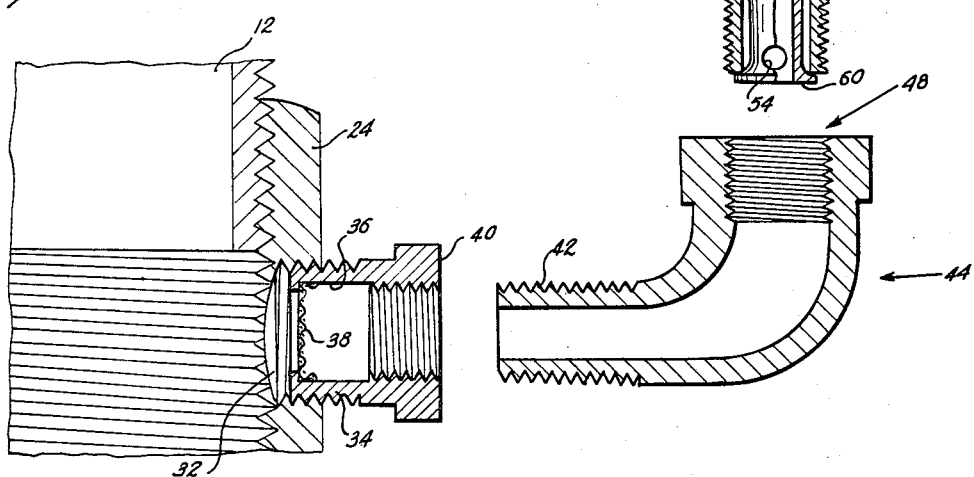
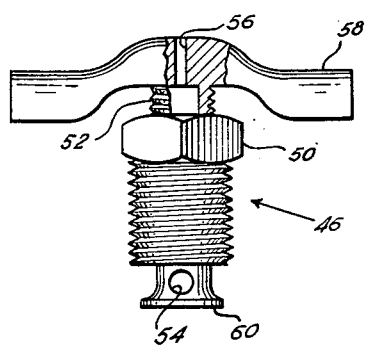
INVENTORS.
CLARK E. STROBURG
ELDON L. STROBURG
BY *Morton L. Adler*
ATTORNEY.

3,384,109
FLOAT VALVE
Clark E. Stroburg and Eldon L. Stroburg, both of
Blockton, Iowa 50836
Filed Apr. 12, 1965, Ser. No. 447,496
9 Claims. (Cl. 137—434)

ABSTRACT OF THE DISCLOSURE

An animal watering tank having a float valve and including a separate water port in the water supply line for directing a stream towards the surface to create a turbulence and agitate the water in order to keep the water from freezing during cold temperatures. Includes a filter for the port to prevent its clogging, with the filter disposed relative to the main supply line so that the flow of water under pressure in the supply line will keep the filter clean.

---

This invention relates to improvements in float valves and more particularly to float valves as are used in animal watering tanks or troughs.

In many areas of the country animal watering troughs are subjected to freezing temperatures at times so that some means must be provided to keep the water from freezing if access to drinking water by the animals is to be maintained. Many forms of fuel consuming tank heaters have been devised and used and if no such devices are used, the animals may sometimes be able to break through a thin layer of ice in which case the float generally found on commercial float valves is usually locked in the surface ice elsewhere in the tank so that it will not function to refill the tank once it is empty. Also, in the use of commercial tank heaters in addition to the expense of the equipment as well as the upkeep, there are frequent cases of malfunctioning and failures so that the object of maintaining ice free water is not always accomplished.

With the above observations in mind, it is one of the important objects of this invention to provide an improved float valve for animal watering troughs which will maintain at least a reasonable area in the tank free of ice even in freezing temperatures.

Another object contemplated herein is the provision of a float valve of the above class that will function properly even though there is ice present in portions of the tank or trough.

A still further object of this invention is to provide a float valve construction for animal watering troughs wherein ice free water can be maintained in freezing temperatures without resorting to any heating element.

To attain these objects and such further objects as may appear herein, or be hereinafter pointed out, reference is made to the accompanying drawings forming a part hereof, in which:

FIG. 1 is a perspective of this invention shown in relation to its operating position of an animal watering tank or trough, FIG. 2 is an enlarged perspective view of a valve or petcock used with this invention, FIG. 3 is an enlarged exploded sectional view showing the relationship of the petcock in FIG. 2 to the water inlet line to the tank in FIG. 1, and with the petcock in closed position, and FIG. 4 is a sectional view of the valve stem of the petcock shown in open position.

Referring to the drawings, an animal watering tank of a commonly used design is designated by the numeral 10 to illustrate the environment in which our float valve structure is used and it will be understood that any open top trough or tank of different designs may be used as desired. A water inlet line 12 is connected to a source of water supply under pressure (not shown) and will extend into the interior of tank 10 near the bottom 14 in a well known manner. A float valve, designated generally by the numeral 16, of any suitable type commercially available is operatively connected to line 12 within tank 10 to function in a normal manner. For this purpose and by way of illustration only, valve 16 is shown as including a ball valve 18 in the outlet end 20 of line 12 and an elongated lever arm 22 pivotally attached at one end to a fitting 24 on line 12 so as to act on ball 18 at times to shut off the discharge of water from pipe end 20. The free end of lever 22 carries a float 26 connected thereto by a float rod 28 and the length of rod 28 can be varied to determine the desired water level in tank 10 at which valve 16 will be actuated to close line 12. Float 26 and similarly arranged floats in other float valve structures commonly in use will always be at the surface of water 30 so that in freezing weather when ice forms at the surface of the water, such floats will be locked in and even if such ice is broken in places by the animals, the ice will hold the float as the water level goes down from the drinking by the animals and thus the valve is not opened to replenish the water supply. This aspect is mentioned here since it is one of the problems which is overcome by our invention as will become apparent from the description which follows.

Pipe or line 12 is provided with a threaded opening 32 below fitting 24 and within tank 10 to receive the fitting 34. Such fitting 34 has a bore 36 provided with a screen filter 38 at one end relative to opening 32 and is internally threaded at 40 at its other end to receive end 42 of the L-shaped conduit 44. In this regard, fitting 34 and conduit 44 may be integral, if desired. A petcock valve assembly 46 of well known construction is threadably engaged in end 48 of conduit 44 by means of the fitting 50. Assembly 46 as seen includes a bored stem 52 in which the bore terminates at the bottom in the lateral opening 54 and communicates at the top in a restricted outlet 56 in the handle 58. The bottom of stem 52 is radially flared as at 60 so as to seat against the bottom of fitting 50. Stem 52 is threadably engaged with fitting 50 and is reciprocally movable relative thereto by rotation of handle 58 so that as seen in FIG. 3, opening 54 is closed off from conduit 44 and as seen in FIG. 4 there is flow communication from pipe 12, through assembly 46 and out of opening 56. No invention is claimed in assembly 46 per se as any comparable structure may be employed with opening 56 preferably oriented upwardly toward the surface of water 30. Thus constructed and arranged, this float valve assembly will operate in the following manner.

For normal use of tank 10 such as during the day when the animals can be expected to drink frequently, assembly 46 will be closed (FIG. 3) and valve 16 will operate to keep the water 30 at the level for which float 26 is set. Even in freezing temperatures, the frequent use of the tank by the animals will normally keep the water ice free. However, when the tank is not used for relatively long intervals in freezing weather, such as overnight, for example, the water will frequently freeze and thus drinking water becomes unavailable to the animals. In such a situation of an anticipated long period of non-use of the tank, the petcock assembly 46 is opened (FIG. 4) with the following results. Water in the tank will rise to the level permitted by float 26 at which point valve 16 will act to shut off water at pipe end 20 and at this point, float 26 will be at the surface of the water. Thus, with pipe 12 closed at end 20 and with assembly 46 open, water will now be passed through assembly 46 and leave opening 56 in a small forceful stream directed upwardly where it will create sufficient turbulence to keep the water ice free if not throughout the tank, at least throughout a reasonably large enough area to afford the animals easy access to ice free water. In this regard, it will be appreciated that incoming water is above freezing temperature so that such warmer water combined with the turbulence created will effectively prevent the formation of ice as described.

A long interval of operation of assembly 46 as indicated may well result in the level of the water rising to the top of tank 10 and even to overflowing at times and as this occurs, it is desirable that float 26 be so arranged that it cannot rise to a point where it could be locked into any ice that may form at portions of the surface. Preferably, we limit the float to approximately one-half the distance between the bottom and top of the tank but this can be varied within the requirements indicated. It will thus be appreciated that during an overnight period, for example, if the tank is used very little or not at all, that the water level will very likely be considerably above float 26. Consequently when the animals resume drinking, float 26 will be in ice free water so that valve 16 is able to function normally whenever the water level is lowered to the limits within which float 26 is designed to function. By this arrangement, in addition to maintaining ice free water in at least a portion of the tank 10, the location of float 26 as described, assures that a continuous supply of water will be available at all times. In the operation of assembly 46 as described, it is pointed out that filter 38 serves to prevent such assembly from becoming clogged with any foreign matter and this is desired since outlet 56 will be relatively small. Such filter 38 as seen in FIG. 3 and as previously described, is disposed at the point of opening 32 in the main water supply line 12 and thus located, will be acted upon by the force of water passing through line 12 when the float valve 16 is open. The effect of this is to periodically clean the filter 38 and thus maintain its efficiency.

Accordingly from the foregoing it is thought a full understanding of the construction and operation of this invention will be had and the advantages of the same will be appreciated.

It will be understood that the phraseology employed herein is for the purpose of description and not for limitation and that modifications and changes can be made within the scope of what is claimed, without departing from the spirit and purpose thereof.

We claim:

1. In an animal watering tank connected by a water line to a source of water under pressure and including a float valve in sand tank connected to said water line for regulating the flow of water into said tank, the combination therewith of an improved means for keeping the water in said tank ice free during freezing temperatures, comprising:
   said water line being provided with a restricted outlet within said tank intermediate said float valve and the source of water supply and oriented toward the top of said tank whereby when said float valve is closed, water will be discharged through said outlet into said tank toward the surface of the water in a forceful stream to agitate the water and maintain a turbulence therein to thereby keep said water ice free in freezing temperatures at least in a portion of said tank,
   filter means for said restricted outlet, and means to clean said filter means.

2. In an animal watering tank connected by a water line to a source of water under pressure and including a float valve in said tank connected to said water line for regulating the flow of water into said tank, the combination therewith of an improved means for keeping the water in said tank ice free during freezing temperatures, comprising:
   a valve member with a restricted outlet within said tank intermediate said float valve and the source of water supply and oriented toward the top of said tank whereby when said float valve is closed, water will be discharged through said outlet into said tank in a forceful stream toward the surface of the water to agitate the water and maintain a turbulence therein to thereby keep said water ice free in freezing temperatures at least in a portion of said tank.

3. A device as defined in claim 2 including manually operable control means on said valve member to selectively open and close the same.

4. In an animal watering tank connected by a water line to a source of water under pressure and including a float valve in said tank connected to said water line for regulating the flow of water into said tank, the combination therewith of an improved means for keeping the water in said tank ice free during freezing temperatures, comprising:
   said water line being provided with a restricted outlet within said tank intermediate said float valve and the source of water supply and oriented toward the top of said tank whereby when said float valve is closed, water will be discharged through said outlet into said outlet into said tank in a forceful stream to agitate the water and maintain a turbulence therein to thereby keep said water ice free in freezing temperatures at least in a portion of said tank,
   the discharge of water through said outlet when said valve is closed permitting said tank to become filled to the top and even overflowing during periods when water is not taken from the tank, and
   said float valve being disposed so that the float thereon in its closed position is limited in its position sufficiently below the top of said tank so that with the tank full of water, the float will remain free of contact with any ice that might form on portions of the surface of the water in freezing temperatures.

5. In an animal watering tank connected by a water line to a source of water under pressure and including a float valve in said tank connected to said water line for regulating the flow of water into said tank, the combination therewith of an improved means for keeping the water in said tank ice free during freezing temperatures, comprising:
   a valve member with a restricted outlet within said tank intermediate said float valve and the source of water supply and oriented toward the top of said tank whereby when said float valve is closed, water will be discharged through said outlet into said tank in a forceful stream to agitate the water and maintain a turbulence therein to thereby keep said water ice free in freezing temperatures at least in a portion of said tank,
   the discharge of water through said outlet when said valve is closed permitting said tank to become filled to the top and even overflowing during periods when water is not taken from the tank, and
   said float valve being disposed so that the float thereon in its closed position is limited in its position sufficiently below the top of said tank so that with the tank full of water, the float will remain free of contact with any ice that might form on portions of the surface of the water in freezing temperatures.

6. A device as defined in claim 5 including manually operable control means on said valve member to selectively open and close the same.

7. In an animal watering tank connected by a water line to a source of water under pressure and including a float valve in said tank connected to said water line for regulating the flow of water into said tank, the combination therewith of an improved means for keeping the water in said tank ice free during freezing temperatures, comprising:
said water line being provided with a restricted outlet within said tank intermediate said float valve and the source of water supply and oriented toward the top of said tank whereby when said float valve is closed, water will be discharged through said outlet into said tank in a forceful stream to agitate the water and maintain a turbulence therein to thereby keep said water ice free in freezing temperatures at least in a portion of said tank,
the discharge of water through said outlet when said valve is closed permitting said tank to become filled to the top and even overflowing during periods when water is not taken from the tank, and
said float valve being disposed so that the float thereon in its closed position is limited in its position relative to the top of said tank so that with water being discharged through said outlet, said float will be submerged in ice free water even though ice may form on portions of the surface of the water in freezing temperatures.

8. In an animal watering tank connected by a water line to a source of water under pressure and including a float valve in said tank connected to said water line for regulating the flow of water into said tank, the combination therewith of:
water discharge means in said water line operable to discharge a small but forceful stream of water into said tank when said float valve is closed and oriented toward the top of said tank to agitate the water and create a turbulence therein to keep said water ice free in freezing temperatures at least in a part of said tank,
a filter means disposed to filter water passing from said water line to said water discharge means, and the flow of water in said water line serving to keep said filter means flushed clean of foreign matter.

9. In an animal watering tank connected by a water line to a source of water under pressure and including a float valve in said tank connected to said water line for regulating the flow of water into said tank, the combination therewith of:
water discharge means in said water line and in said tank intermediate said float valve and the source of water supply and oriented toward the top of said tank,
the closing of said float valve rendering said water discharge means effective to discharge a small but forceful stream of water into said tank to agitate the water and create a turbulence therein to keep said water ice free in freezing temperatures at least in a part of said tank,
a filter means disposed to filter water passing from said water line to said water discharge means, and
the opening of said float valve resulting in a flow of water in said water line past and in contact with said filter means so as to maintain said filter means free of foreign material.

References Cited
UNITED STATES PATENTS

| | | | |
|---|---|---|---|
| 566,592 | 8/1896 | Long. | |
| 858,401 | 7/1907 | Lamb | 137—426 |
| 1,574,755 | 3/1926 | Peterson | 119—78 |
| 1,787,420 | 12/1930 | Peitzman | 137—444 |
| 2,532,999 | 12/1950 | Donahoe et al. | 119—78 X |

WILLIAM F. O'DEA, *Primary Examiner.*

D. R. MATTHEWS, *Assistant Examiner.*